United States Patent [19]

Oatway et al.

[11] Patent Number: 5,320,305
[45] Date of Patent: Jun. 14, 1994

[54] PROPULSION SYSTEM FOR AN AIRCRAFT PROVIDING V/STOL CAPABILITY

[75] Inventors: Thomas P. Oatway, Chatsworth; Robert S. Bollinger, Newhall; Leland M. Nicolai, Castaic, all of Calif.

[73] Assignee: Lockheed Corporation, Calabasas, Calif.

[21] Appl. No.: 917,241

[22] Filed: Jul. 22, 1992

[51] Int. Cl.$^5$ ............................................. B64C 29/00
[52] U.S. Cl. ................... 244/12.3; 244/23 B; 244/55; 244/60; 60/226.1
[58] Field of Search .................. 244/12, 23, 55, 60; 60/226.1, 39.15

[56] References Cited

U.S. PATENT DOCUMENTS

| | | |
|---|---|---|
| 1,130,623 | 3/1915 | Mustonen . |
| 2,899,149 | 8/1959 | Breguet ............................. 244/12.3 |
| 2,918,231 | 12/1959 | Lippisch ............................ 244/23 B |
| 3,025,025 | 3/1962 | Duttmann ......................... 60/226.1 |
| 3,068,647 | 12/1962 | Santamaria et al. .............. 60/226.1 |
| 3,122,343 | 2/1964 | Leibach et al. ...................... 244/60 |
| 3,181,294 | 5/1965 | Donohue ............................ 60/39.15 |
| 3,194,516 | 7/1965 | Messerschmitt ................... 60/226.1 |
| 3,258,911 | 7/1966 | Bouquet et al. ................... 60/39.15 |
| 3,517,509 | 6/1970 | Bayati ................................. 60/226.1 |
| 3,783,618 | 1/1974 | Kawamura ......................... 244/23 B |
| 4,469,294 | 9/1984 | Clifton ............................... 244/12.3 |
| 4,474,345 | 10/1984 | Musgrove ........................... 244/53 R |
| 4,791,783 | 12/1988 | Neitzel ................................... 60/262 |
| 4,828,203 | 5/1989 | Clifton et al. ...................... 244/12.3 |

FOREIGN PATENT DOCUMENTS

| | | |
|---|---|---|
| 2736120 | 2/1978 | Fed. Rep. of Germany ..... 244/12.3 |
| 2917303 | 10/1980 | Fed. Rep. of Germany ..... 60/226.1 |

OTHER PUBLICATIONS

Bevilaque et al, WO 91/17083 Nov. 14, 1991.

Primary Examiner—Galen L. Barefoot
Attorney, Agent, or Firm—Louis L. Dachs

[57] ABSTRACT

The invention is a propulsion system for powering an aircraft in both vertical and horizontal flight modes. In detail, the invention includes a pair of ducted lift fans mounted in the aircraft for providing thrust in the vertical flight mode. A pair of ducted cruise fans are mounted in the aircraft for providing thrust in the horizontal flight mode. Two sets of turboshaft engines are mounted in the aircraft with each of the sets comprising a plurality of the turboshaft engines, each turboshaft engine including an output shaft and having an optimal power output sufficient for powering one of the pair of ducted cruise fans in the horizontal flight mode. Each of the sets includes a sufficient number of the turboshaft engines to provide an optimal power output for powering one of the pair of ducted lift fans and one of the pairs of ducted cruise fans the vertical flight mode. A shafting system is mounted in the aircraft for coupling all of the turboshaft engines to the pairs of ducted fans. A first decoupling system is connected to the shafting system for decoupling the pair of ducted lift fans from the sets of turboshaft engines. Finally, a second decoupling system is connected to the shafting system for individually decoupling each of the turboshaft engines from the shafting system.

7 Claims, 4 Drawing Sheets

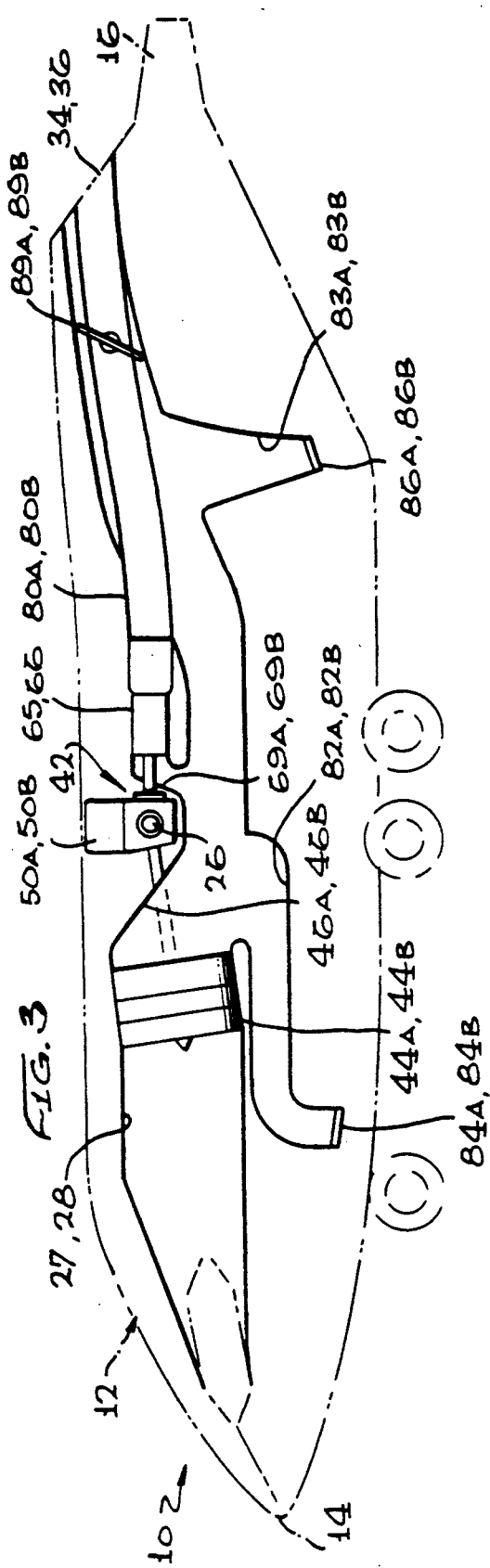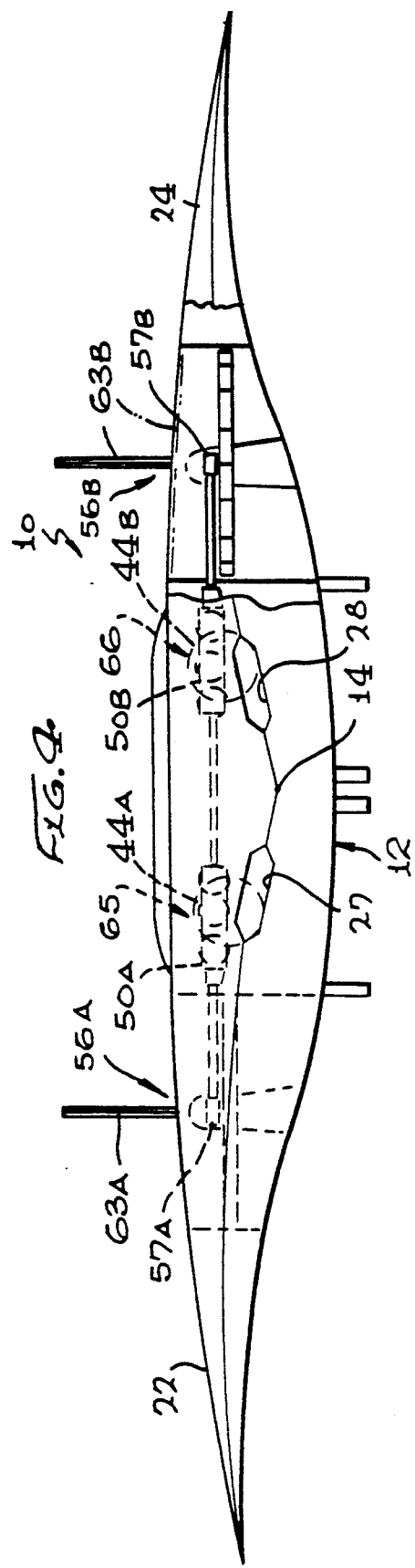

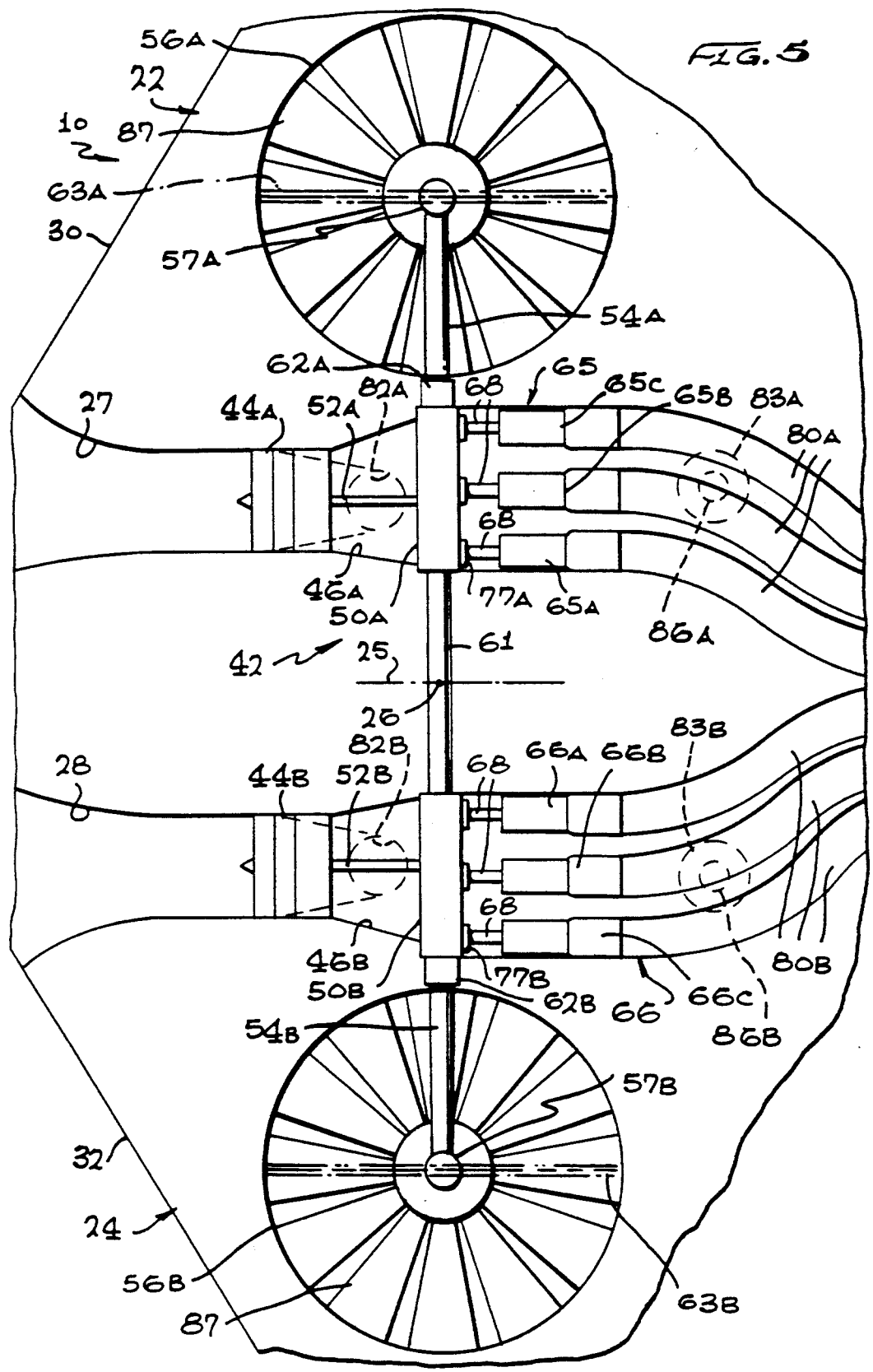

PROPULSION SYSTEM FOR AN AIRCRAFT PROVIDING V/STOL CAPABILITY

BACKGROUND OF THE INVENTION

1. Field of the Invention

The invention relates to the field of propulsion systems for aircraft and, in particular, to propulsion systems for vertical and/or short take-off aircraft (V/STOL).

2. Description of Related Art

The efficiency of a propulsion system for an aircraft is maximized when the velocity of the exhaust gases equals the velocity of the aircraft in its flight direction at minimum specific fuel consumption. Thus during takeoff, landing, and hovering it is obvious that a helicopter, which provides a small incremental velocity to a large mass of air (low disc loading), is more efficient than a jet aircraft, which provides a large incremental velocity to a small mass of air (high disc loading). However, a helicopter, because of its very large diameter rotor, has a limited forward velocity of less than 200 Knots due to compressibility effects on the rotor blade tips. Thus most V/STOL aircraft are compromises, which either limits the forward velocity of the aircraft (helicopter) or requires oversized engines for vertical flight (jet aircraft) causing a loss in cruise efficiency.

For example, the AV-8A Harrier V/STOL aircraft utilizes a turbofan engine for both hover and cruise propulsion. The turbofan engine was sized to produce adequate thrust for vertical lift in hover, but its correspondingly large frontal area increases the drag of the aircraft and limits its maximum speed to less than Mach 1 (approximately 580 Knots at sea level). However, the turbofan exhaust is of significantly high velocity and, thus propulsion efficiency is low at cruise velocities because the engine is oversized for this flight mode and hovering, which requires maximum power, for any significant amount of time is avoided because of the high fuel consumption.

In U.S. Pat. No. 4,474,345, "Tandem Fan Series Flow V/STOL Propulsion System" by R. G. Musgrove, a jet engine with a small fan, which is capable of providing supersonic performance, is modified to provide vertical lift. The basic engine fan is split to provide fore and aft fans connected by means of a common drive shaft. The fans are centrally mounted in a duct located within the aircraft along its longitudinal axis. In normal wingborne flight (hereinafter referred to as horizontal flight mode), the fans operate in series with the fan exhaust mixing with the turbine exhaust and exiting through a nozzle located at the rear of the aircraft. In the vertical mode of operation, a diverter is positioned downstream of the forward fan and is movable to a position for diverting the exhaust from the forward fan downward relative to the longitudinal axis of the aircraft, while simultaneously opening an auxiliary inlet for permitting the introduction of air to the aft fan. An aft diverter is located in the nozzle which is also moveable to a position for diverting the exhaust from the aft fan and engine core downward. Thus for vertical flight the diverters are actuated causing the exhaust from both fans and the core engine to be directed downward fore and aft of the center of gravity of the aircraft. However, the tandem fan engine has less thrust in the vertical takeoff and landing mode of operation than it has in the normal flight mode of operation. The thrust is greater in cruise because airflow passes through both fans, and thus the core is supplied with air that is raised to a higher pressure level (supercharged); whereas, in the vertical mode the core engine airflow passes through only the aft fan. Consequently, the tandem fan concept is not an efficient design for a V/STOL aircraft.

Another more efficient approach is to couple a separate large diameter lift fan to the main turbofan by means of a drive shaft. The lift fan is clutched in and powered only during vertical flight modes. In addition, both the fan section and turbine section exhaust are deflected downward to provide lift. Increased performance is obtained because some of the turbofan's power is being used to drive the lift fan, which is more efficient at the low vertical take-off and landing speeds. Such a system can be found in co-pending U.S. patent application Ser. No. 07/521,211 "Propulsion System For A V/STOL Aircraft," filed May 5, 1990. However, as with all the designs discussed above, the propulsion systems are designed primarily for supersonic high-speed flight and modified for V/STOL operation. They are not readily applicable for subsonic aircraft where significant hover time is required.

In U.S. Pat. No. 4,791,783, "Convertible Aircraft Engine" by R. E. Neitzel, a turbofan concept is disclosed for converting almost all the power used by the engine fan to shaft horsepower to drive a helicopter rotor. Guide vanes located on both sides of the outer portion of the engine fan can be actuated to block off air flow through the fan duct while still allowing air flow into the engine core. A gear mounted on the forward end of the fan shaft is coupled to a drive shaft which in turn drives the rotor. Such a system provides maximum efficiency during takeoff and landing and also during normal flight. However, if high-speed flight, (greater than 0.5 Mach) is to be accomplished, the rotor must be either stopped (x-wing concept) or stopped and stowed. The former concept requires an extremely complex computer-controlled pneumatic blowing system that, to this date, has not been successfully developed. The latter system causes a severe weight penalty and requires a complex folding and stowing system. Furthermore, it is difficult to achieve low-observable (LO) characteristics with either design.

The tilt rotor concept, found in the V-22 Osprey aircraft, uses large diameter propellers powered by two cross-shafted turboshaft engines. Its disc loading is higher than a helicopter, but lower than a turbofan and, thus is efficient in the vertical flight modes; however, the large propellers limit the top speed to about 300 Knots at sea level. Again, this is due to compressibility effects on the propeller tips. Furthermore, the large propellers eliminate it as a candidate for missions where a low radar cross-section is required. Tilt pylon-mounted turbofan engines can obtain a higher cruising speed, but lose vertical flight mode efficiency because of the high disc loadings. In addition, pylon-mounted engines of any type, where the fan is visible to radar signals, are also unsuitable for LO missions.

The type of V/STOL aircraft that appears to be most suitable for missions where low radar cross-section is required is one where the entire propulsion system is imbedded in the aircraft wing and/or fuselage. For example, as in a ducted fan-in-wing for the vertical flight mode and turbo-jet or turbofan engines for the horizontal flight modes. The overall concept is rather old, dating at least back to 1914. For example, U.S. Pat. No. 1,130,623 "Flying Machine" by M. L. Mustionen discloses pylon-mounted lift propellers and a pusher propeller mounted in the tail, all powered by a single piston engine. However, with modern V/STOL aircraft, safety requirements dictate the use of multiple engines with cross-shafting to obtain engine-out performance in the vertical flight mode. Examples of this concept can be found in U.S. Pat. Nos. 4,828,203, "Vertical/Short Take-Off And Landing Aircraft" and 4,469,294, "V/STOL Aircraft," both by R. T. Clifton, et al. This aircraft design uses two pylon-mounted ducted propellers for the vertical flight mode and a rear-mounted ducted propeller for the horizontal flight mode. Two engines are mounted in the airframe and "belt drive" a common shaft that is directly connected to the rear mounted propeller. The drive shaft is also connected to a right-angle gearbox which in turn drives the two pylon-mounted ducted lift propellers by means of belt drives. It is apparent that such a combination aircraft design and propulsion system, as configured, does not lend itself to LO missions because of the rear-mounted ducted propeller used for the horizontal flight mode. However, even if it were installed in a proper airframe, it still would not provide the necessary propulsion efficiency and engine-out performance required for any practical aircraft.

The basic problem is that in an aircraft, such as a transport, the ratio of thrust required for takeoff in the vertical flight mode to that required for efficient cruise in the horizontal flight mode is on the order of 10 to 1. Having multiple engines simply to provide for engine-out capability yields a thrust mismatch between the cruise and vertical flight modes. If the aircraft has only two engines and it requires both engines for a normal takeoff in the vertical flight mode, then each engine alone must be able to provide the total thrust required (in a max power setting for engine-out capability). This means that each of the two engines must be greatly oversized and therefore will yield very poor cruise efficiency. It's either this approach or stay with a single engine, as in the AV-8A Harrier aircraft. To date, no prior design has sufficiently addressed this problem.

Thus it is a primary object of the subject invention to provide a propulsion system for a vertical and/or short take-off and landing aircraft.

It is another primary object of the subject invention to provide a propulsion system for a vertical and/or short take-off and landing aircraft that provides increased propulsive efficiency in the horizontal flight mode.

It is a further object of the subject invention to provide a propulsion system for use in low-observable vertical and/or short take-off and landing aircraft.

It is a still further object of the subject invention to provide a propulsion system for a vertical and/or short take-off and landing aircraft that provides engine-out capability.

It is another object of the subject invention to provide a propulsion system for a vertical and/or short take-off aircraft that provides optimum or near optimum efficiency of the propulsion system in both the vertical and horizontal flight modes.

SUMMARY OF THE INVENTION

The invention is a propulsion system for powering a vertical and/or short take-off and landing (V/STOL) aircraft in both vertical and horizontal flight modes. The propulsion system is primarily designed for use on V/STOL aircraft that are intended to spend only moderate periods in the vertical flight mode, takeoff and landing, and moderate periods at hover. Such aircraft may vary in size and shape, but are generally conventional in look, in that they have a fuselage, wings and pitch, roll and yaw axes control surfaces and the like.

In detail, the invention includes a pair of ducted lift fans mounted on the aircraft, typically in the wings, for providing thrust in the vertical flight mode. The ducted lift fans are located on the center of gravity of the aircraft so that pitching moments due to the thrust of the lift fans are eliminated. The ducted lift fans include movable covers on the top that remain open while in the vertical flight mode. Also, incorporated on the bottom of the ducted lift fans are adjustable louvers that are used to direct the lift fan exhaust downward and fore and aft. A pair of ducted cruise fans are mounted in the aircraft for providing thrust in the horizontal flight mode. Two sets of turboshaft engines are mounted in the aircraft with each typically between the wings and within the fuselage, each one of the sets having a plurality of the turboshaft engines. Each one of the turboshaft engines incorporates an output shaft and is sized such that it has an optimal power output sufficient for powering one of the pair of ducted cruise fans in the horizontal flight mode. Furthermore, each of the sets has a sufficient number of the turboshaft engines to provide an optimal power output for powering one of the pair of ducted lift fans and one of the pair of ducted cruise fans while in the vertical flight mode. The sets of turboshaft engines are mounted within the aircraft located between the ducted cruise fans and the exhaust nozzles and coupled to the bypass air ducts such that the cruise fan discharge supercharges the turboshaft engines.

A shafting system is mounted in the aircraft for coupling all the turboshaft engines to the first and second pairs of ducted fans. In detail, the shafting system comprises first and second combiner gearboxes coupled to the output shafts of the turboshaft engines of each set thereof, respectively. Each combiner gear box includes: a first power output drive shaft coupled to one of the ducted lift fans; a second power output drive shaft coupled to one of the ducted cruise fans; and a third power output drive shaft (cross-shaft) coupling the two combiner gearboxes together to provide for single engine out capability.

A first decoupling system (typically a clutch) is connected between the first power output drive shaft and the corresponding ducted lift fan for decoupling the ducted lift fans from the sets of turboshaft engines. A second decoupling system is connected between each combiner gearbox and the output shafts of the individual turboshaft engines connected thereto for individually decoupling the turboshaft jet engines from the combiner gear boxes.

A system to provide pitch control is provided. The system, typically, comprises a duct system that couples the bypass air ducts of the ducted cruise fans to downward directed nozzles located fore and aft of the center of gravity and offset from the longitudinal axis of the aircraft. Additionally, valves are located in the air bypass ducts aft of the sets of turboshaft engines and the pitch control duct system that are closed when in the vertical flight mode to insure that all by pass air from the ducted lift fans are directed to the pitch control system. Pitch control, therefore, can easily be accomplished by modulating the flow of pressurized air out the nozzles. Yaw control is provided by movement of the lift fan louvers to slightly vector the downward thrust of the ducted lift fans, forward on one ducted lift fan and aft on the other. Additionally, the ducted lift fans have variable pitch propellers that are used to modulate the downward thrust collectively for vertical control or individually for roll control. The power transmitted to the ducted lift fans is maintained at a constant RPM.

The propulsion system functions in the following manner. For takeoff, all the turboshaft engines of both sets of turboshaft engines are operational and the clutch assemblies are all engaged so that the ducted lift fans receive power. The ducted lift fan covers and louvers are open. With all the engines operating, the ducted lift fans are used to achieve vertical takeoff. After sufficient altitude has been reached, the louvers are slowly moved to the aft position directing more and more ducted lift fan exhaust from a vertical direction to a rearward direction as the aircraft transitions to the horizontal flight mode. When sufficient lift is produced by the wings to sustain wingborne flight, the ducted lift fans are disengaged and stopped and the covers and louvers are closed. Thereafter, all but one of turboshaft engines of each set of turboshaft engines are de-clutched and shut down and cruise is accomplished using "single-engine driven ducted cruise fans." The important advantage of this system is that by the proper selection of the size and number of turboshaft engines, efficient matching of engines to the particular flight regime can be achieved while also providing engine-out capability due to the use of multiple engines and cross-shafting. Since all the turboshaft engines are located in the low-velocity region behind the ducted cruise fans, the drag associated with shutting down one or more engines is inconsequential.

The landing procedure is a reverse of that used for takeoff. The ducted lift fans are engaged slowly while the aircraft is still in wingborne flight (horizontal flight mode). The top covers and lower louvers are opened as the power to the ducted lift fans is increased. The louvers are vectored slightly forward to decelerate the aircraft from the horizontal flight mode to hover. As more thrust is required from the lift fans for hover, the louvers are slowly moved aft to the vertical position. The variable pitch propellers of the ducted lift fans as well as the overall power produced by the sets of turbohshaft engines are modulated to reduce thrust allowing the aircraft to slowly descend to the ground.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 3 is a side view of the aircraft shown in FIG. 1.

FIG. 4 is a front view of the aircraft shown in FIG. 1.

FIG. 5 is an enlarged portion of FIG. 2, particularly illustrating a portion of the propulsion system's turboshaft engines, ducted lift fans, ducted cruise fans, shafting system and pitch control system.

FIG. 6 is a partial cross-sectional view of the aircraft shown in FIG. 1 taken along the line 6—6, particularly illustrating the ducted lift fan exhaust directing louver system for the wing-mounted ducted lift fans and its upper covers.

DESCRIPTION OF THE PREFERRED EMBODIMENT

Figure 1:
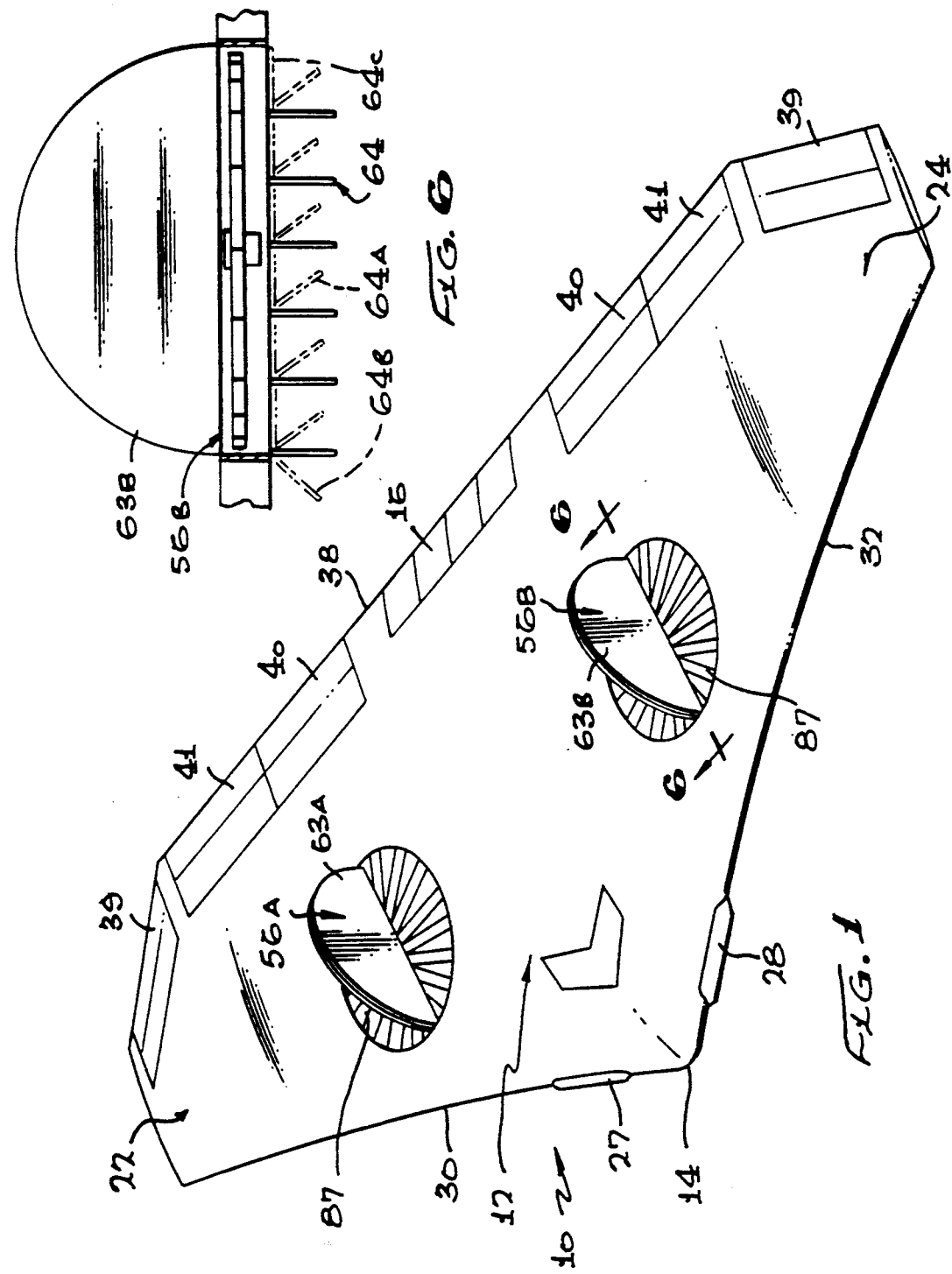
FIG. 1 is a perspective view of a V/STOL aircraft incorporating the subject propulsion system.

Referring to FIGS. 1–6 together, a transport type aircraft is illustrated and generally designated by numeral 10 having a nose 14, tail 16, high-mounted wings 22 and 24, well integrated into the fuselage 12. The longitudinal axis and center of gravity of the aircraft are indicated by numerals 25 and 26, respectively. The engine inlet ducts 27 and 28 are located at the leading edges 30 and 32 of the wings 22 and 24, respectively, at the junction thereto to the fuselage 12. Two-dimensional exhaust nozzles 34 and 36 exit the aircraft near the trailing edge 38. Also illustrated are ailerons 39 for roll control, elevators 40 for pitch control and drag rudders 41 for yaw control in the horizontal flight mode. The aircraft 10 is meant to be representative of multi-engine transports of general V/STOL configuration and, thus should not be construed as limiting the application of the subject propulsion system.

The subject propulsion system, generally designated by numeral 42, includes ducted cruise fans 44A and 44B mounted within the aircraft and coupling the inlet ducts 27 and 28 to ducted cruise fan bypass air ducts 46A and 46B, respectively. The bypass air ducts 46A and 46B turn smoothly downward aft of the ducted cruise fans 44A and 44B and then turn gradually upward and join the exhaust nozzles 34 and 36, respectively, in a generally "U" shape. Combiner gearboxes 50A and 50B are located outside the bypass air ducts in the in the middle of the "U" shaped portion thereof aft of the ducted cruise fans 44A and 44B. The combiner gearboxes 50A and 50B include: first power output shafts 52A and 52B connected directly to the ducted cruise fans 44A and 44B, respectively; second power output shafts 54A and 54B connected to ducted lift fans 56A and 56B located on the center of gravity 26 in the wings 22 and 24, respectively; and a third power output shaft 61 which serves as a cross-shaft between the two combiner gearboxes 50A and 50B. Clutch assemblies 62A and 62B are mounted between the combiner gearboxes 50A and 50B and shafts 54A and 54B, respectively. Ducted lift fan brake assemblies (not shown) are mounted in the right angle gear boxes 57A and 57B of the ducted lift fans 56A and 56B, respectively. Additionally, the combiner gearboxes incorporate power transmission gears (not shown) to distribute the power generated to the various power output shafts.

Figure 2:
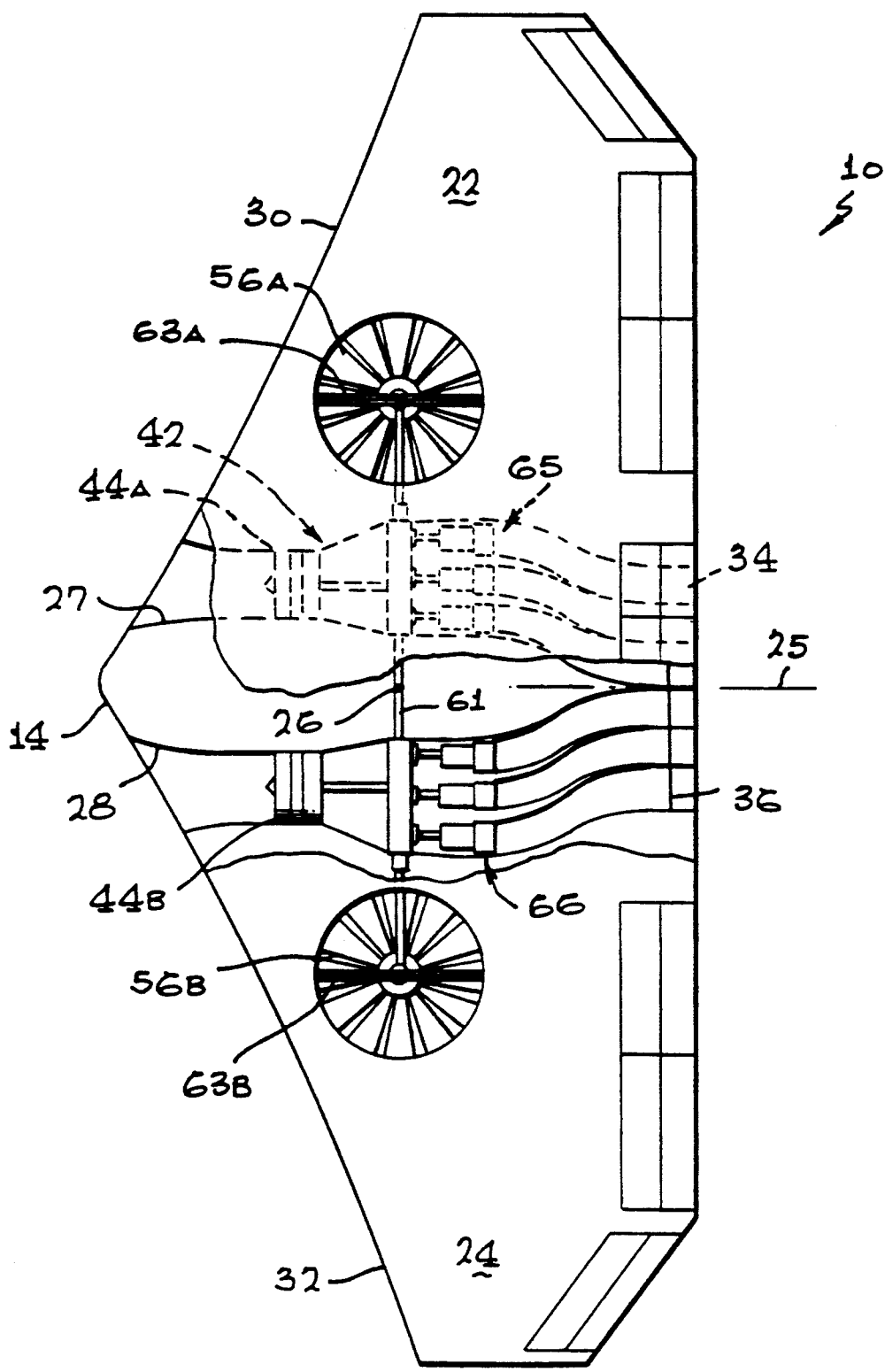
FIG. 2 is a top view of the aircraft shown in FIG. 1 particularly illustrating the subject propulsion system mounted therein.

Referring particularly to FIGS. 1, 2 and 6, the ducted lift fans 56A and 56B have covers 63A and 63B, respectively, that are shown in the open position. These covers are opened when the aircraft is operating in the vertical flight mode and transitioning to and from the horizontal flight mode and closed in the horizontal flight mode. Particularly referring to FIG. 6, the ducted lift fans 56A and 56B (only fan 56B is illustrated) include a plurality of louvers 64, which are shown in the fully extended position in solid lines and in the partially extended fore, aft, and closed positions in dotted lines and indicated by numerals 64A, 64B and 64C, respectively. As they translate, they are able to direct ducted lift fan exhaust forward to provide reverse thrust when transitioning from the horizontal to the vertical flight mode and backward providing forward thrust during transition from the vertical to the horizontal flight mode. In addition, they provide horizontal control and yaw control during the vertical flight mode (hover) by differential movement thereof.

Two sets of turboshaft engines, 65 and 66 are mounted within the aircraft aft of the combiner gearboxes 50A and 50B, also located outside the bypass air ducts in the "in the middle of the U shaped portion thereof aft of the ducted cruise fans 44A and 44B. Each set 65 and 66 has three turboshaft engines 65A, 65B and 65C, and 66A, 66B and 66C respectively, with all the engines having output drive shafts 68. The output drive shafts 68 of the turboshaft engines of the first and second sets, 65 and 66 are coupled to the combiner gearboxes 50A and 50B, respectively, via clutch assembles 77A and 77B. Each turboshaft engine of each set is "sized" to provide an optimal power output to drive one of the ducted cruise fans. Thus in the horizontal flight mode, two engines, one from each set, are required to remain in operation and all the remaining turboshaft engines are shut down. Each set of turboshaft engines contains a sufficient number of turboshaft engines to provide an optimal power output to operate one of the pair of ducted cruise fans and one of the pair of ducted lift fans in the vertical flight mode and still allow for a single engine-out capability. The sets 65 and 66 of turboshaft engines are coupled by means of ducts 69A and 69B (best seen in FIG. 3) to the bypass air ducts 46A and 46B aft of the combiner gearboxes. Mounting the combiner gearboxes and sets of turboshaft engines outside of the air bypass ducts 46A and 46B provides ease of access for maintenance and/or removal of these major components. However, they can be mounted directly within the bypass ducts, which would decrease internal duct complexity. The exhaust ducts 80A and 80B of the turbojet engines of the sets 65 and 66, respectively, enter the bypass air ducts 45A and 45B, and terminate co-incedently with the exhaust nozzles 34 and 36, respectively.

In addition, a first downward directed set of bypass air transfer ducts 82A and 82B are connected to the bypass air ducts 46A and 46B, respectively, forward of the center of gravity 26 and offset from the longitudinal axis 25 of the aircraft and a second set of downward directed bypass air transfer ducts 83A and 83B are connected to the bypass ducts aft of the center of gravity 25 also offset from the longitudinal axis 26. High pressure air aft of the ducted cruise fans is directed downward via variable flow rate nozzles 84A and 84B, and 86A and 86B for the pitch control mounted on the ends of the ducts 82A, 82B, 83A and 83B, respectively, to provide pitch control. In the horizontal flight mode these valves are closed. Control valves 89A an 89B (best seen in FIG. 3) are mounted in the bypass air cuts 46A and 46B and are used to divert the ducted cruise fan exhaust to the valves 84A and 84B and 86A and 86B, respectively. In addition, the ducted lift fans 56A and 56B have variable pitch propeller blades 87 that are used to modulate the vertical thrust collectively for vertical control and individually for roll control. The louvers 64 can be vectored individually for yaw control or collectively for deceleration, acceleration and horizontal control.

The propulsion system 42 functions in the following manner. For takeoff, all the turboshaft engines of both sets 65 and 66 are operational and the clutch assemblies 77A and 77B are engaged. The clutch assemblies 62A and 62B are also engaged so that the ducted lift fans receive power. The covers 63A and 63B and louvers 64 are open. With all engines operating, the ducted lift fans are used to achieve vertical takeoff with the duct systems 82A and 82B used for pitch control. The ducted lift fans 56A and 56B with their variable pitch propeller blades 87 are used to modulate the vertical thrust collectively for vertical control and individually for roll control. The louvers 64 are vectored individually for yaw control or collectively for deceleration, acceleration and horizontal control.

After sufficient altitude has been reached, the louvers 64 are slowly moved aft directing more and more lift fan exhaust from a vertical direction to a rearward direction as the aircraft transitions to the horizontal flight mode. When sufficient lift is produced by the wings to sustain flight, the clutch assemblies 62A and 62B are disengaged. The brake assemblies (not shown) for ducted lift fans are engaged to stop the ducted lift fans 56A and 56B, and the covers 63A and 63B and louvers 64 are closed. Thereafter, all but one turboshaft engine of each set, 65 and 66, are shut down and cruise is accomplished using "single-engine driven ducted cruise fans."

The important advantage of this system is that by proper selection of the size and number of turbofan engines, efficient matching of engines to the particular flight regime can be achieved while also providing engine-out capability due to the use of multiple engines and cross-shafting. In the example provided above, six engines were necessary to obtain the vertical flight mode operation and only two engines were necessary for the horizontal flight mode operation while providing engine-out capability. The actual aircraft illustrated was designed for short takeoff and landing at maximum gross weight and vertical flight mode operation (hover) was required only for over the target area. Thus the aircraft was designed with a maximum take-off gross weight greater than the maximum vertical thrust of the ducted lift fans. However, by the time the target area would be reached, enough fuel would have been consumed such that the gross weight of the aircraft would have been reduced to a value below the available ducted lift fan thrust. Of course, the aircraft could have taken off in the vertical flight mode, if less fuel and/or payload was loaded thereon. The important feature of this invention is that of matching of engine performance to the flight mode by: 1) selecting each turboshaft engine so that it has an optimal power output, sufficient for powering one of the pair of ducted cruise fans so that the aircraft can operate efficiently in the horizontal flight mode and provide engine-out capability; and 2) adding additional engines to each side to form sets having optimal power output sufficient for powering one of the pair of ducted lift fans and one of the pair of ducted cruise fans for vertical flight mode operation and cross-shafting the two sets together to allow engine-out capability. This provides an optimum or near optimum propulsion system for any aircraft with a greater overall propulsive efficiency than any of the propulsion systems disclosed in the previously mentioned prior art.

While, the above propulsion system incorporated two ducted cruise fans, two ducted lift fans and two sets of turboshaft engines, with each set having three turboshaft engines, it should be readily apparent that the number of each can be varied depending on the proposed mission of the aircraft. Thus the best mode example provided above should not be considered as a limitation of the invention.

While the invention has been described with reference to a particular embodiment, it should be understood that the embodiment is merely illustrative as there are numerous variations and modifications which may be made by those skilled in the art. Thus the invention is to be construed as being limited only by the spirit and scope of the appended claims.

INDUSTRIAL APPLICABILITY

The invention has applicability to the aircraft industry.

We claim:

1. A propulsion system for powering an aircraft in both vertical and horizontal flight modes comprising:
   a pair of ducted lift fans mounted in the aircraft for providing thrust in the vertical flight mode;
   a pair of ducted cruise fans mounted in the aircraft for providing thrust in the horizontal flight mode each of said pair of ducted cruise fans having an inlet duct and a bypass air duct;
   two sets of turboshaft engines mounted in the aircraft with each one of said sets comprising a plurality of said turboshaft engines, each said turboshaft engine including an output shaft and having an optimal power output sufficient for powering one of said pair of ducted cruise fans in the horizontal flight mode, each of said sets having a sufficient number of said turboshaft engines to provide an optimal power output for powering one of said pair of ducted lift fans and one of said pair of ducted cruise fans in the vertical flight mode;
   a shafting system mounted in the aircraft for coupling all of said turboshaft engines to said pairs of ducted lift fans and ducted cruise fans;
   a first decoupling system connected to said shafting system for decoupling said pair of ducted lift fans from said sets of turboshaft engines; and
   a second decoupling system connected to said shafting system for individually decoupling each of said turboshaft engines from said shafting system.

2. The propulsion system as set forth in claim 1 comprising said sets of turboshaft engines mounted externally from said bypass air ducts and behind said ducted cruise fans.

3. The propulsion system as set forth in claim 2 comprising a pair of transfer ducts mounted in said aircraft, one said transfer ducts coupling one of said air bypass ducts to one of said sets of turboshaft engines and the other said transfer duct coupling the other said air bypass duct to the other said set of turboshaft engines.

4. The propulsion system as set forth in claim 3 wherein the aircraft includes wings, the propulsion system further comprising:
   said pair of ducted lift fans are mounted in the wings; and
   said pair of ducted cruise fans are mounted between said pair of ducted lift fans.

5. The propulsion system as set forth in claim 4 wherein said shafting system comprises first and second combiner gearboxes coupled to said output shafts of said turboshaft engines of said first and second sets thereof, respectively, each combiner gearbox having a first output drive shaft coupled to one of said ducted cruise fans, a second output drive shaft coupled to one of said ducted lift fans, and a third output shaft interconnecting said combiner gearboxes.

6. The propulsion system as set forth in claim 5 where in said combiner gearboxes are mounted externally of said air bypass ducts.

7. The propulsion system as set forth in claim 6 wherein the aircraft has a center of gravity and a longitudinal axis, and includes means for controlling pitch of the aircraft comprising:
   a pair of first pitch control ducts mounted on one side of the longitudinal axis and fore and aft of the center of gravity of the aircraft, said pair of first pitch control ducts having one coupled to one of said pair of air bypass ducts;
   a pair of second pitch control ducts mounted on the opposite side of the longitudinal axis and fore and aft of the center of gravity of the aircraft, said pair of second pitch control ducts having one end coupled to the other one of said pair of air bypass ducts;
   control valves mounted in the other ends of each of said pitch control ducts for controlling the direction and air flow from said air bypass ducts out of said other ends of said pitch control ducts; and
   a air bypass duct control valve mounted in each of said air bypass ducts downstream of said one ends of said pitch control ducts for blocking the flow of bypass air from said ducted cruise fans.

* * * * *